United States Patent [19]

Minkow

[11] 4,304,331

[45] Dec. 8, 1981

[54] SHIELD FOR MAGNETIC TAPE CASSETTES

[76] Inventor: Robert Minkow, 1203 N. Kings Rd., Los Angeles, Calif. 90069

[21] Appl. No.: 111,733

[22] Filed: Jan. 14, 1980

[51] Int. Cl.³ .................... B65D 85/67; B65D 59/02
[52] U.S. Cl. ........................... 206/387; 242/199
[58] Field of Search ............... 242/198, 54, 199; 206/387; 360/132

[56] References Cited

U.S. PATENT DOCUMENTS

| | | |
|---|---|---|
| D. 221,915 | 9/1971 | Goldthwaite. |
| 3,272,325 | 1/1966 | Schoenmakers. |
| 3,743,374 | 7/1973 | Glass. |
| 3,746,180 | 7/1973 | Spiroch ............... 206/387 |
| 3,747,745 | 7/1973 | Esashi ............... 206/387 |
| 4,067,629 | 1/1978 | Amatsu ............... 206/387 |
| 4,087,145 | 5/1978 | Weavers. |
| 4,119,200 | 10/1978 | Cassidy ............... 206/387 |

Primary Examiner—George E. Lowrance
Attorney, Agent, or Firm—Nilsson, Robbins, Dalgarn, Berliner, Carson & Wurst

[57] ABSTRACT

A shield for use with a magnetic tape cassette in which the cassette is formed with a shaped boss defining an open tape transport region, the shield comprising, integrally, an apron formed with an opening for receiving the shaped boss, a ledge projecting substantially at a right angle from the inner surface of the apron for covering the open tape transport region, nibs upon a free edge of the ledge for securing the apron to a surface of the cassette, and spaced prongs extending from the inner surface of the apron for engaging cassette sprocket holes to restrain sprockets therein from turning.

7 Claims, 4 Drawing Figures

U.S. Patent  Dec. 8, 1981  4,304,331
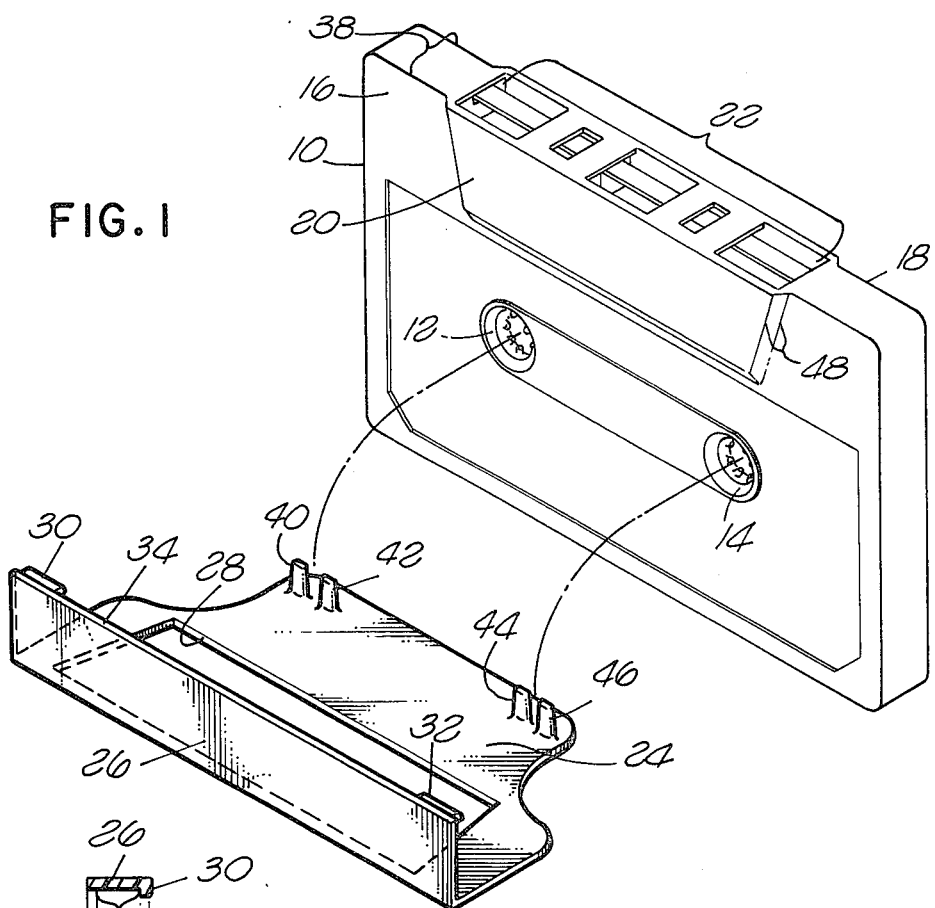
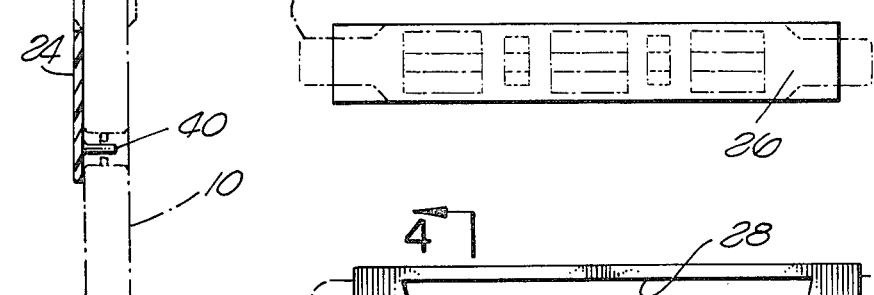
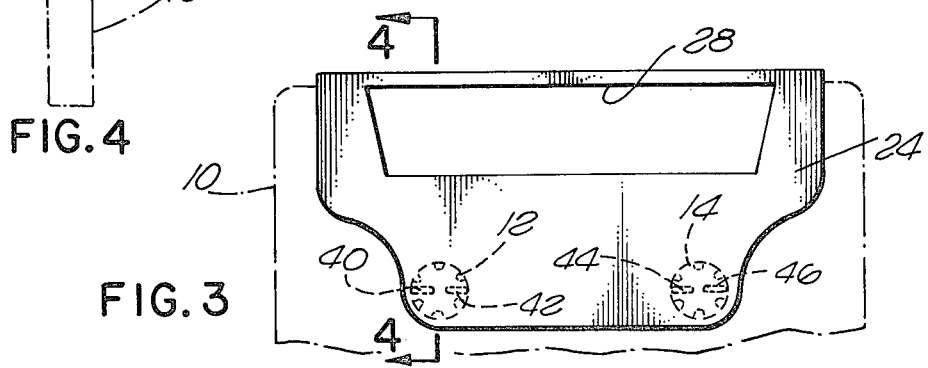

SHIELD FOR MAGNETIC TAPE CASSETTES

FIELD OF THE INVENTION

The field of art to which the invention pertains includes the field of magnetic tape cassettes.

BACKGROUND AND SUMMARY OF THE INVENTION

The utilization of magnetic tape recorders, particularly those using magnetic tape cartridges or cassettes has burgeoned in recent years with a resultant increase in the number of cassettes. The fact that automobiles are now often equipped with cassette players has further increased the use of cassettes. Such cassettes are often supplied in a case which serves as a dust cover and which is usually fitted with some mechanism for restraining the rotation of the sprockets. The case provides a protective function and it is desirable that the cassette be stored in the case between uses. Not only does the case protect the cassette from dust and mechanical abuse, but by restraining the movement of the sprockets, prevents the tape from accidentally unwinding. In the absence of restraint, when the tape is transported from one place to the other, or is placed in the groove compartment of a moving car, jostling of the cassette can result in unwinding of the sprocket with consequent loosening of the tape so that when it is played, the sudden tightening of the inner spool on its sprocket could result in tearing of the tape.

A drawback to the usual magnetic tape cassette case is that it is substantially bulkier than the cassette itself. This results partially from the fact that the cassette case must be deep enough to accomodate the thickest portion of the cassette, i.e., the trapezoidally shaped boss adjacent the open tape transport region of the cassette, and additionally includes some mechanism to make the tape readily and easily removable, usually taking the form of a pivot tray within the case itself. Add to this the usual practice of storing, with the cassette, information about the cassette and its contents and the result is a package which is substantially bulkier than the cassette. Since the cassette itself is usually labeled to contain most of the information packaged in the case that is of interest to the purchaser, oftentimes the purchaser will simply discard the case choosing to store the cassettes alone. Consequently, the cassettes suffer the dangers which the case was intended to avoid, simply because of the bulk of the case and the inconvenience of storing the cassette in the case.

The present invention provides a means for overcoming the foregoing problems by providing a shield for a magnetic tape cassette which is very readily and easily applied to the cassette yet which does not add to the total thickness dimension of the cassette. In particular, the shield comprises, integrally, an apron formed with an opening for receiving the shaped boss adjacent the open tape transport region of the cassette, a ledge which projects substantially at right angles from the inner surface of the apron for covering the open tape transport region, and means for securing the apron to a surface of the cassette. Additionally, the cassette can be provided with keeper means extending from the inner surface of the apron for engaging at least one of the sprocket holes to restrain the sprocket therein from turning. The keeper means can comprise prongs placed along the length of the apron.

The apron is preferably of a thickness which approximates the distance the boss is raised from the cassette surface. In keeping with the shape of the cassette boss, the opening is in the form of an isosceles trapezoid for matingly engaging the perimeter of the boss. The apron securing means preferably comprises a pair of nibs on the ledge adjacent an outer edge of the ledge, spaced from the apron a distance substantially the same as the thickness of the edge of the cassette. The nibs are aligned with the apron on opposite ends of the opening, so that each nib, the ledge and the apron, together, form in cross-section a U-shaped channel for receiving the cassette edge.

By forming the shield of transparent material, any label on the cassette can be readily perceived, the shield forming with the cassette a very compact unit permitting storage of a much larger number of cassettes than would be permitted were the cassettes themselves stored in cases, yet providing the mechanical and dust protecting advantages of the case.

BRIEF DESCRIPTION OF THE DRAWINGS

FIG. 1 is a perspective, exploded view of a typical magnetic tape cassette and the shield of the present invention;

FIG. 2 is a bottom plan view of the shield showing the cassette in dashed line;

FIG. 3 is an elevational view of the shield, showing the cassette n dashed line; and FIG. 4 is a cross-sectional view of the shield taken on line 4—4 of FIG. 3, in the direction of the arrows.

DETAILED DESCRIPTION

Referring to FIG. 1, there is shown a magnetic tape cassette 10 of typical construction. The cassette has a pair of sprocket holes 12 and 14, opposed parallel side surfaces 16 and 18 defining an edge thickness of the cassette and a shaped boss 20 raised from each of the surfaces 16 and 18. The boss is in the shape of an isosceles trapezoid on each surface with the long edge defining an open tape transport region, indicated at 22.

Referring now to FIGS. 1-4 together, the shield of the present invention is formed integrally as a generally L-shaped member including an apron 24 and a ledge 26 projecting at a substantially right angle from the inner surface of the aprong 24. The apron 24 is formed with an opening 28 in the form of an isosceles trapezoid for matingly engaging the perimeter of the cassette boss 20.

A pair of nibs 30 and 32 are provided on the ledge adjacent an outer edge 34 of the ledge. The nibs 30 and 32 are spaced from the apron 24 a distance, indicated at 36, which is substantially the same as the casette edge thickness, indicated at 38. The nibs 30 and 32 are aligned with the apron on opposite ends of the opening, each nib, the ledge and the apron together forming in cross-section a U-shaped channel, as shown at the top of FIG. 4, for receiving the cassette edge thereby securing the apron 24 to a surface of the cassette.

Two pairs of prongs, indicated at 40 and 42 at one side and 44 and 46 spaced therefrom on the other side, extend from the inner surface of the apron 24 and serve to engage the sprocket holes 12 and 14, respectively, to restrain sprockets therein from turning.

The apron 24 is substantially flat and has a width and length dimension less than the corresponding dimensions of the cassette. Specifically, as illustrated in FIG. 3, the shield fits around the trapezoidal boss and extends onto the cassette a distance just sufficient to cover the sprocket openings 12 and 14. The apron is preferably designed with a thickness that is not sufficient to extend beyond the outer surface of the boss 20. In this regard, the thickness of the apron 24 is approximately the distance the boss 20 is raised from the cassette surface, as indicated in FIG. 1 at 48.

It will be appreciated that because of the standardization of cassette sizes, the shield can be defined within certain dimensions. The apron is 7.5-9.9 centimeters at its longer dimension, 3.3-6.3 centimeters wide and about 0.15 centimeter thick. The ledge is 7.5-9.9 centimeters at its longest dimension, about 1.2 centimeters wide and about 0.15 centimeter thick. Preferably, the shield is formed of transparent organic polymer material so as permit a view through the shield of information on the cassette label.

As required, a detailed illustrative embodiment of the invention has been disclosed. However, it is to be understood that this embodiment merely exemplifies the invention which may take forms that are somewhat different from the specific illustrative embodiment disclosed. Therefore, specific structural details are not to be interpreted necessarily limiting, but as a basis for the claims which define the scope of the invention.

What is claimed is:

1. For use with a magnetic tape cassette having a pair of sprocket holes, opposed parallel side surfaces defining an edge thickness of said cassette, and a shaped boss raised from at least one of said surfaces adjacent said cassette edge defining an open tape transport region, a shield comprising, integrally:

a substantially flat apron having a width and length dimension less than the corresponding dimensions of said cassette and formed with an opening for receiving said shaped boss;

a ledge projecting at substantially a right angle from the inner surface of said apron for covering said open tape transport region; and means for securing said apron to a surface of said cassette comprising a pair of nibs rigidly integral with and adjacent an outer edge of said ledge, projecting normal to said ledge, spaced from each other to be proximal to respective sides of said opening, and spaced from said apron a distance substantially the same as said cassette edge thickness.

2. The shield of claim 1 including keeper means extending from the inner surface of said apron for engaging at least one of said sprocket holes to restrain a sprocket therein from turning.

3. The shield of claim 1 in which said opening is in the shape of an isosceles trapezoid for matingly engaging the perimeter of said cassette boss.

4. The shield of claim 1 in which said apron is 7.5-9.9 centimeters in its longest dimension and 3.3-6.3 centimeters wide, and said ledge is 7.5-9.9 centimeters in its longest dimension and about 1.2 centimeters wide.

5. The shield of claim 1 in which the thickness of said apron is approximately the distance said boss is raised from said cassette surface.

6. The shield of claim 1 formed of transparent organic polymer material.

7. For use with a magnetic tape cassette having a pair of sprocket holes, opposed parallel side surfaces defining an edge thickness of said cassette, and a shaped boss raised from at least one of said surfaces adjacent said cassette edge defining an open tape transport region, a shield comprising, integrally:

a substantially flat apron having width and length dimensions less than the corresponding dimensions of said cassette and formed with an opening in the shape of an isosceles trapezoid for matingly engaging the perimeter of said cassette boss;

a ledge projecting at substantially a right angle from the inner surface of said apron for covering said open tape transport region;

a pair of nibs on said ledge adjacent an outer edge of said ledge, spaced from said apron a distance substantially the same as said cassette edge thickness and aligned with said apron on opposite ends of said opening, each nib, said ledge and said apron together forming in cross-section a U-shaped channel for receiving said cassette edge whereby to secure said apron to a surface of said cassette; and prongs spaced along the length of said apron, said prongs each comprising a spaced pair of prongs, each pair being located to extend from the inner surface of said apron into a cassette sprocket hole to restrain the sprocket therein from turning.

* * * * *